No. 865,368. PATENTED SEPT. 10, 1907.
J. B. ENTZ.
SYSTEM OF ELECTRICAL DISTRIBUTION.
APPLICATION FILED DEC. 30, 1905.
3 SHEETS—SHEET 1.
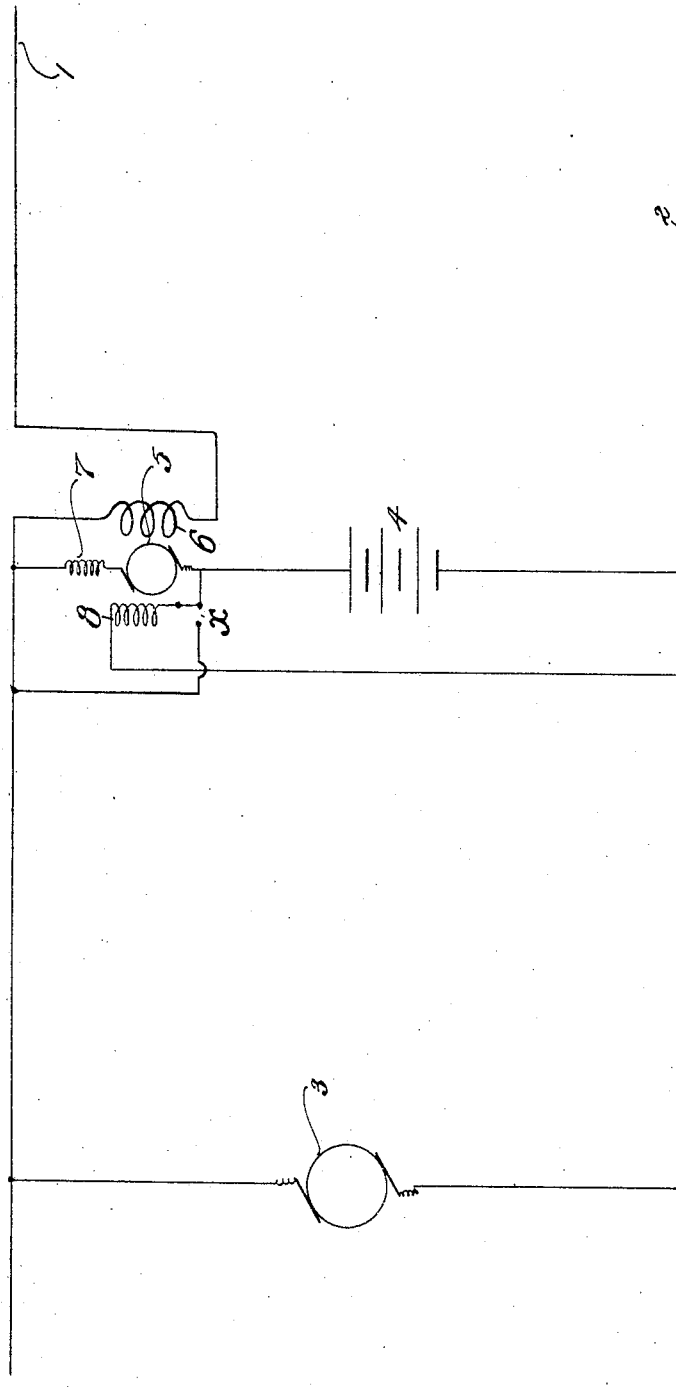
Fig: 1.

No. 865,368. PATENTED SEPT. 10, 1907.
J. B. ENTZ.
SYSTEM OF ELECTRICAL DISTRIBUTION.
APPLICATION FILED DEC. 30, 1905.
3 SHEETS—SHEET 2.
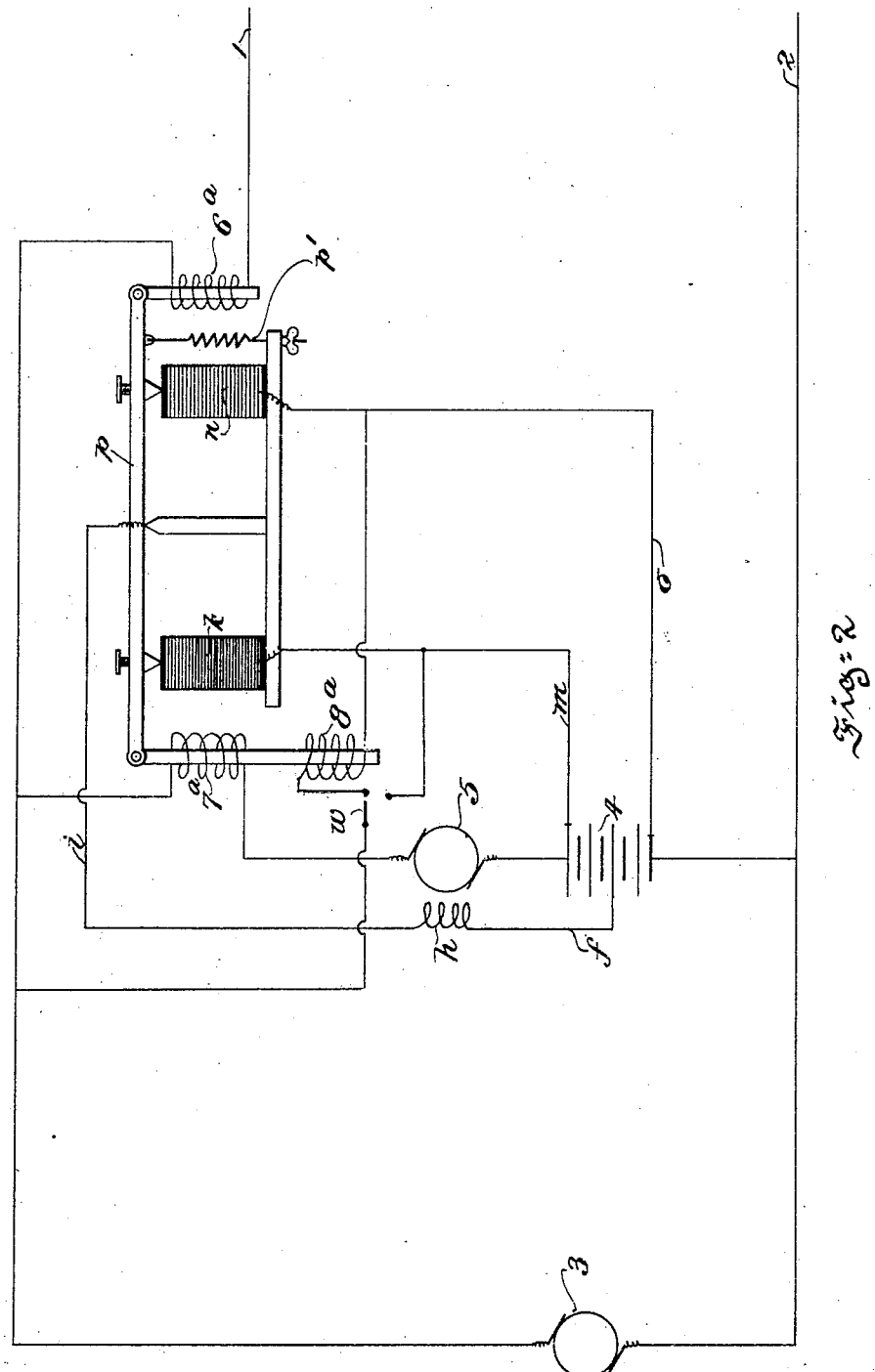

No. 865,368. PATENTED SEPT. 10, 1907.
J. B. ENTZ.
SYSTEM OF ELECTRICAL DISTRIBUTION.
APPLICATION FILED DEC. 30, 1905.
3 SHEETS—SHEET 3.
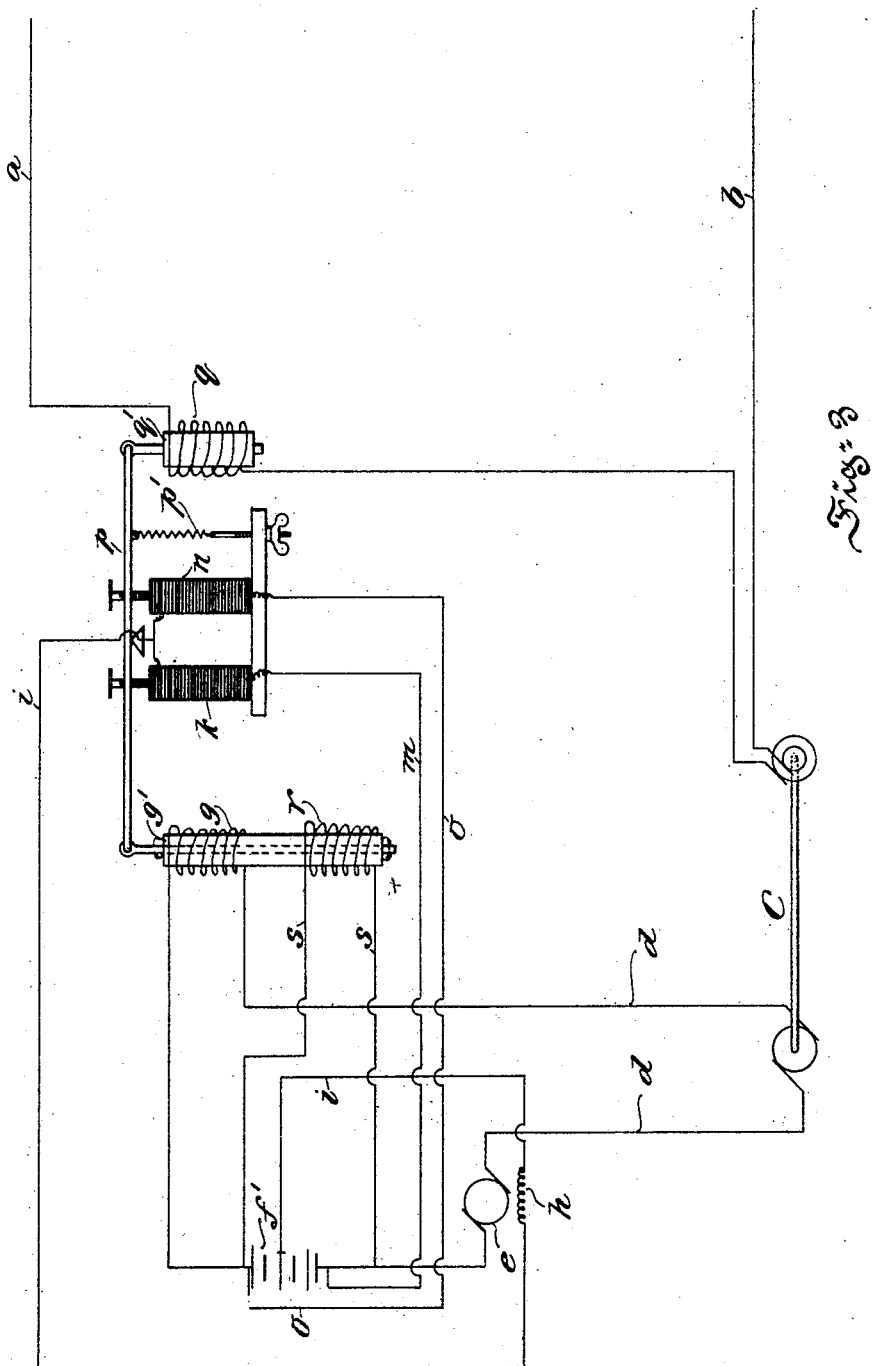

UNITED STATES PATENT OFFICE.

JUSTUS B. ENTZ, OF PHILADELPHIA, PENNSYLVANIA.

SYSTEM OF ELECTRICAL DISTRIBUTION.

No. 865,368.           Specification of Letters Patent.           Patented Sept. 10, 1907.

Application filed December 30, 1905. Serial No. 293,972.

*To all whom it may concern:*

Be it known that I, JUSTUS B. ENTZ, a citizen of the United States, and a resident of Philadelphia, in the county of Philadelphia and State of Pennsylvania, have invented a certain new and useful System of Electrical Distribution, of which the following is a specification.

The invention has relation to a system of distribution comprising among other things a storage battery and its complementary booster.

Hitherto methods of controlling storage batteries by means of boosters had the influencing means connected into the working circuit, in which case the full variation of load occurring in the working circuit affects the booster. In other cases the influencing means have resided in the generator circuit, in which case the influencing means had been due to the permissible variation of current in this circuit, which is usually the circuit which it is wished to keep constant. In the present invention the regulating means is the difference in the change of load in the working circuit and the change of load in the battery circuit, this difference of load representing that which would occur in the generator circuit.

In the present invention the effect which compels the booster to cause the battery to charge or discharge is the total variation or fluctuation in load on a work circuit or branch thereof outside of the battery connection modified by the battery current, or in other words, the permissible difference between the battery current and the whole fluctuation of current in any work circuit, so that if there are divided work circuits the fluctuations in any one or more of them, may in connection with the battery current be utilized to compel the battery to charge or discharge.

Objects of the present invention are to obtain such sensitiveness and stability of regulation that the battery will properly coöperate with the rest of the system to provide for effecting regulation in response to total changes in the whole load or in some particular load or loads while providing proper and efficient means for controlling and regulating the operation of the battery, and to a complish these ends while at the same time guarding against any accidental discharge which might occur back from the battery onto the generator.

To these and other ends hereinafter set forth the invention stated in general terms comprises the improvements to be presently described and finally claimed.

The nature, characteristic features and scope of my invention will be more fully understood from the following description taken in connection with the accompanying drawings forming part hereof and in which Figure 1, is a diagrammatic view illustrating one system of distribution embodying features of the invention. Fig. 2, is a similar view showing the coils arranged to act through the intervention of a booster regulator, and Fig. 3, is a similar view illustrating the invention in application to a system of distribution involving certain devices which are not shown in Fig. 1.

Referring to Fig. 1, 1 and 2, designate the working circuit and across them is arranged the generator 3, which may have a flat rising or other characteristic. The battery 4, and its properly driven booster 5, are arranged in series with each other and across the working circuit 1—2. 6, is a series coil arranged in the conductor 1, of a working circuit and it responds to the whole load of this circuit and may constitute (as shown in Fig. 1) a field coil of the booster. At any rate, it influences the field of the booster in such a way that the latter tends to make the battery discharge at times of heavy load. 7, is a coil arranged in the battery branch and in series with the booster armature and it is opposed to or differentiated with the coil 6. When the battery is discharging its current traverses the coil 7, in such a way as to tend to influence the booster field in the appropriate manner for limiting or opposing the battery discharge. The coil 7, is shown in this figure as a field coil, but it may be otherwise arranged to accomplish its function as will be hereinafter described. Means are provided for opposing and at times of normal load balancing the effect of the coil 6. An example of such means is the coil 8, connected across some fairly constant source as shown for example, across the generator or battery terminals according, as shown in the drawings, to the position of the switch $x$, and the coil 8 is so arranged as to influence the booster field. In this figure it is shown as applied to the booster as a field coil, but it may be otherwise applied. At times of normal load the battery is not discharging so that the coil 7 is not effective; and the coils 8 and 6 counteract or balance each other so that the booster permits the battery to neither charge nor discharge. Upon increase of load the coil 6 immediately responds to the entire increase of load and influences the booster to compel the battery to discharge. However, upon discharge of the battery the coil 7 becomes energized and opposes the coil 6; thus cutting down its effect. The result of this is that the battery is compelled by the coil 6 to discharge promptly upon the occurrence of an overload or increase of load above the normal and the discharge of the battery influencing the coil 7 limits, modifies or controls the effective action of the coil 6 so as to prevent the battery from unduly taking an excess of the increase of load. Conversely a falling off of load below the normal influences the coil 6 so as to permit the coil 8 to predominate and cause the booster to compel the battery to charge and immediately upon its charging the coil 7, becomes energized and by opposing the coil 8 properly controls its action and there is effected a proper charge of the battery. Inasmuch as the coil 7, influences the booster to oppose the battery discharge it follows that if the generator voltage should for any reason fall off the coil 7 would operate to prevent a rush of current from the battery back onto the generator.

In Fig. 2, the series coil $6^a$, the coil $7^a$, in the battery branch and the coil $8^a$ connected across some fairly constant source are shown as applied to a booster regulator instead of as constituting field coils of the booster. The constant source as shown is the generator 3, but the switch $w$, affords means for using the battery 4, as the constant source.

In Fig. 2, $k$, and $n$, are piles of carbon or like material and they are respectively connected by conductors $m$, and $o$, across some suitable source, for example, the battery 4. $p$, is a pivotal lever of conducting material adapted to press upon one or the other of the piles or groups of carbon $k$, and $n$, and connected by means of a conductor $i$, through the field $h$, by means of a conductor $f$, to an intermediate point of the source across which the conductors $m$, and $o$, are connected; in the present instance to an intermediate point of the battery. The pivotal lever $p$, is provided with solenoid cores, one of which coöperates with the coil $6^a$ and the other with the coils $7^a$ and $8^a$. $p^1$ is a spring which may be provided for applying a pull to the pivotal lever $p$.

At times of normal load the battery is neither charging or discharging so that the coil $7^a$, is not energized and the coil $8^a$ balances the coil $6^a$. Upon increase of load above the normal the coil $6^a$ preponderates in respect to the coil $8^a$ and the pressure upon the pile $n$ is increased while that upon the pile $k$, is diminished, the result of this is that current passes through the regulator to the field $h$, in such a way as to influence the booster to compel the battery to discharge. However, as soon as the battery begins to discharge the coil $7^a$, is energized by the battery current which passes through it and this coil $7^a$, when energized opposes the effect of the coil $6^a$ upon the lever $p$, thus relieving the pile $n$, from pressure and subjecting the pile $k$ to pressure. The result of this is that the field $h$, is so modified that the discharge is controlled, limited, or modified. It will of course be understood that the coil $7^a$, is so wound and arranged in relation to the coil $8^a$, that the coil $7^a$, adds its pull to that of the coil $8^a$ when the battery is discharging and opposes its pull to that of the coil $8^a$ when the battery is charging. When the load falls below normal the coil $6^a$, no longer preponderates over the coil $8^a$, so that the latter operates upon the lever $p$, in such a way as to so adjust the relative resistance of the piles $k$, and $n$, as to cause the current traversing the field $h$, to make the booster 5, charge the battery. However, the charging current traverses the coil $7^a$, and causes it to modify the action of the coil $8^a$, in such a way that the battery is properly charged.

In Fig. 3, there is shown an alternating current circuit $a$—$b$, across which there is a load. $c$, is a generator having alternating and direct current ends or brushes, the alternating current end of which supplies the current $a$—$b$. $d$, is a circuit which includes the direct current end of the part $c$, and also a properly driven booster $e$, and storage battery $f$, and a coil $g$. $h$, is a field coil for the booster $e$, and it is shown as included in a circuit $i$, whose path originates at an intermediate point of the battery and divides, one part being by way of the resistance material $k$, and conductor $m$, to one end of the battery and the other part being by way of the resistance material $n$, and the conductor $o$, to the other end of the battery. The pivotal lever $p$, serves to vary the resistance of either one or the other of the parts $k$, and $n$, by pressing upon them and these parts $k$, and $n$, may consist of piles of carbon. $q$, is a coil interposed in the alternating circuit $a$—$b$, and it is responsive to the total change of the load. $r$, is a coil connected across a fairly constant source as shown by the circuit $s$, across the battery terminals. The coil $q$, contains a core $q^1$, which is attached to the lever $p$, and the coils $r$, and $g$, contain a core $g^1$, which is connected to the lever $p$. An adjustable balancing spring $p^1$, is also shown.

The mode of operation of the apparatus shown in Fig. 3, is the same as that shown in Figs. 1 and 2, except that an increase of load above the normal on the circuit $a$—$b$, influences the solenoid $q$, which acting upon the lever $p$, so varies the resistance of the parts $k$, and $n$, that the field $h$, influences the booster $e$, to compel the battery to discharge. Discharge of the battery energizes the coil of the solenoid $g$, thus counteracting the effect of the coil $q$, since the coils $g$ and $q$, are differentiated or opposed, and in this way the resistance at $k$—$n$ is so affected that the coil $h$, is modified in its effect and causes the battery to discharge properly and to a less extent than it would do under the influence of the solenoid $q$, alone and without the modifying action of the coil $g$. This discharge of the battery operates upon the piece of apparatus $c$, and reinforces it. At times of less than the normal load on the circuit $a$—$b$, the solenoid coil $r$, predominates over the pull of coil $q$, and operates upon the lever $p$, in such a way as to cause it to influence the resistance $n$—$k$, properly for providing a field at $h$, appropriate for charging the battery, but the charging of the battery influences the coil $g$, and modifies the effect of the solenoid coil $r$, because it is appropriately wound, so that the charging is properly effected and the energy required for charging the battery is derived from the piece of apparatus $c$. At times of normal load the coil $r$, balances the coil $q$, and the battery neither charges nor discharges and has no effect upon the piece of apparatus $c$. From the foregoing description it will be seen that the load upon the piece of apparatus $c$, or rather upon the means which drive it, is kept approximately constant.

It will be obvious to those skilled in the art to which the invention relates that modifications may be made in details without departing from the spirit thereof, hence the invention is not limited further than the prior state of the art may require, but

Having thus described the nature and objects of my invention, what I claim as new and desire to secure by Letters Patent is

1. A system of electrical distribution comprising a working circuit and its generator, a battery circuit including a battery and its booster, a series coil arranged in the working circuit and responsive to changes in the whole load thereon and adapted to influence the booster field to cause the battery to discharge upon increase of load, a series coil in the battery circuit opposed to the first mentioned coil on discharge and adapted to influence the booster field to cause the booster to work in opposition to current from the battery, and a third coil adapted to influence the booster field and to oppose the first mentioned coil, substantially as described.

2. A system of electrical distribution comprising a working circuit and its generator, a battery circuit including a battery and its booster, a series coil arranged in the working circuit and responsive to changes in the whole load thereon and adapted to influence the booster field, a series coil in the battery circuit opposed to the first mentioned coil on discharge and adapted to influence the booster field, and means for opposing the effect of the first mentioned coil, substantially as described.

3. A system of electrical distribution comprising a booster having three field influencing coils of which one is responsive to the whole load and another is opposed during battery discharge to the first and is in series with the booster armature and battery and the third is a balancing coil for opposing the first mentioned coil, a load circuit, a battery, and a generator, substantially as described.

4. A system of electrical distribution comprising a booster having two field influencing coils of which one is responsive to the whole load and another is opposed to the first on battery discharge and is in series with the booster armature and battery, means for opposing the first mentioned coil, a working circuit, a battery, and a generator, substantially as described.

5. A system of electrical distribution comprising a generator having an alternating current circuit and a direct current circuit, a battery and booster in the direct current circuit, a coil in the alternating current circuit for influencing the booster fields, a coil in the direct current circuit opposed to the first mentioned coil and adapted to influence the booster field, and means for opposing the first mentioned coil, substantially as described.

6. A system of electrical distribution comprising a generator having a direct current circuit and an alternating current circuit, a battery and booster in the direct current circuit, opposed coils adapted to influence the booster field and whereof one is in the alternating current circuit and the other is in the direct current circuit, and a third coil for opposing the coil in the alternating current circuit, substantially as described.

In testimony whereof I have hereunto signed my name.

JUSTUS B. ENTZ.

Witnesses:
K. M. GILLIGAN,
W. J. JACKSON.